United States Patent [19]

Luscan et al.

[11] 4,203,284
[45] May 20, 1980

[54] COMBUSTION CHAMBER FOR A RAMJET AND BOOSTER ROCKET

[75] Inventors: Bernard Luscan, Merignac; Michel Reichard, Pessac, both of France

[73] Assignee: Societe Europeenne de Propulsion, Puteaux, France

[21] Appl. No.: 940,146

[22] Filed: Sep. 6, 1978

[30] Foreign Application Priority Data

Sep. 7, 1977 [FR] France ................................ 77 27097
Mar. 28, 1978 [FR] France ................................ 78 08958

[51] Int. Cl.² .............................................. F02K 9/04
[52] U.S. Cl. ......................................... 60/245; 60/250
[58] Field of Search .......................... 60/245, 250, 263

[56] References Cited
U.S. PATENT DOCUMENTS
3,357,187  12/1967  Whitlock .............................. 60/250

FOREIGN PATENT DOCUMENTS
2277982  2/1976  France ........................................ 60/245

Primary Examiner—Robert E. Garrett
Assistant Examiner—Edward Look
Attorney, Agent, or Firm—Lewis H. Eslinger

[57] ABSTRACT

The invention relates to a combustion chamber of a ramjet and booster rocket, which comprises an inner envelope provided with upstream lateral ports for the inlet of air and a downstream nozzle for ejecting the combustion gases, to allow functioning of the rocket at cruising speed; an outer envelope, concentric to the inner envelope and closed, with the exclusion of a single rear port for the ejection of the gases, to allow functioning of the rocket at launching speed; and separating means for separating from the combustion chamber at least a part of the outer envelope, at the end of the launching phase, in order to ensure the clearance of the upstream lateral ports of the inner envelope.

14 Claims, 7 Drawing Figures

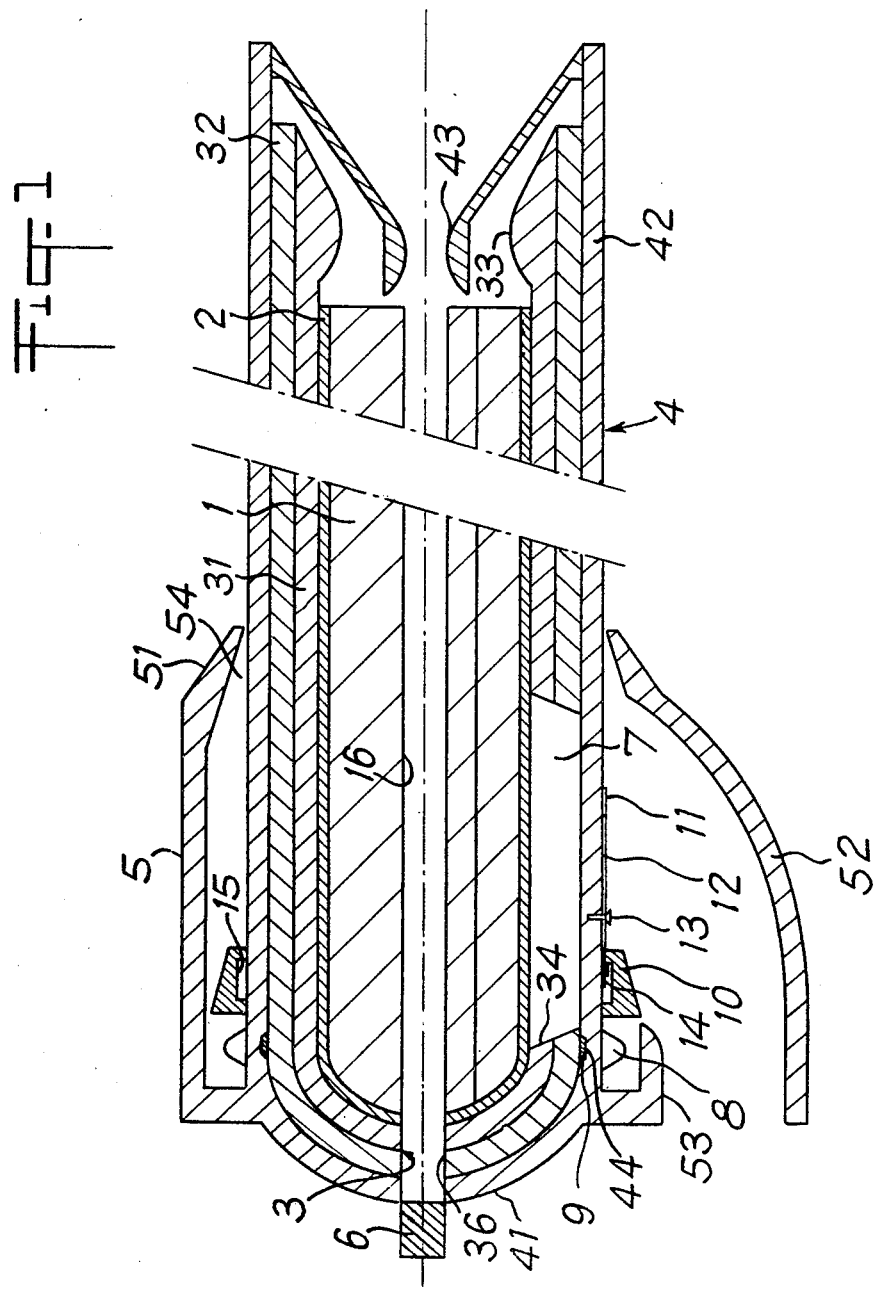

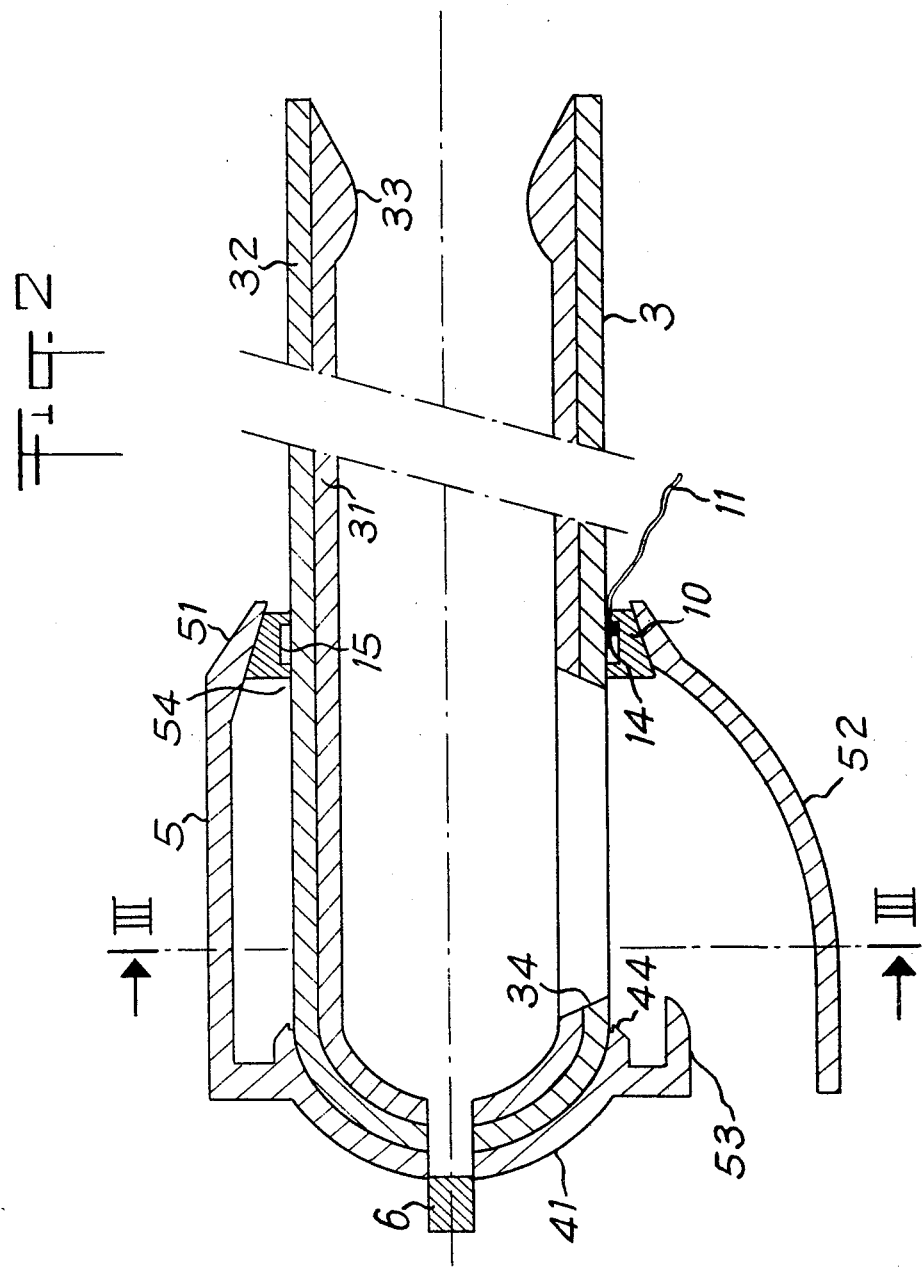

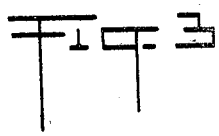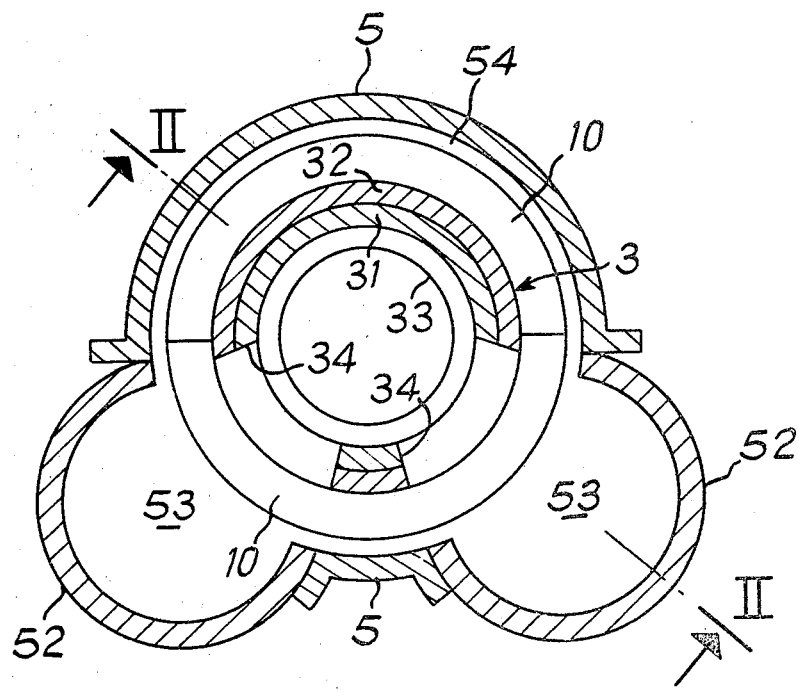

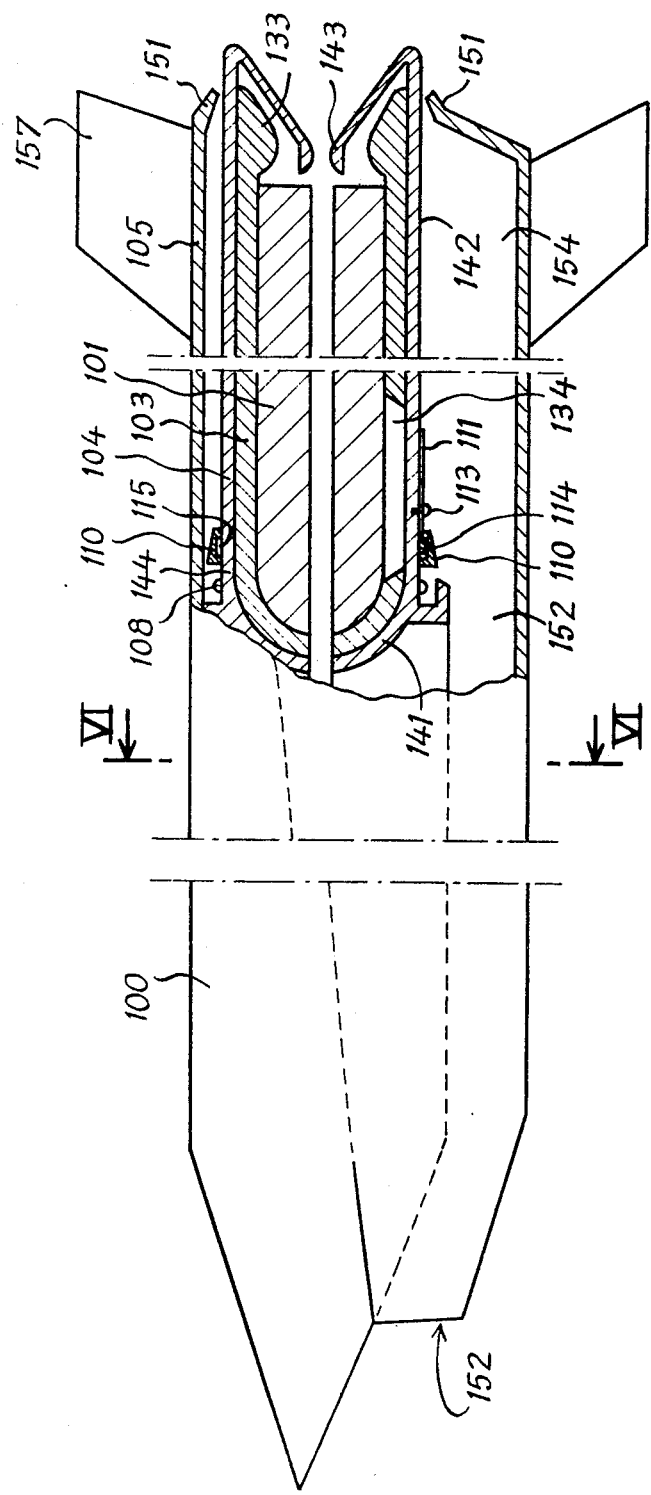

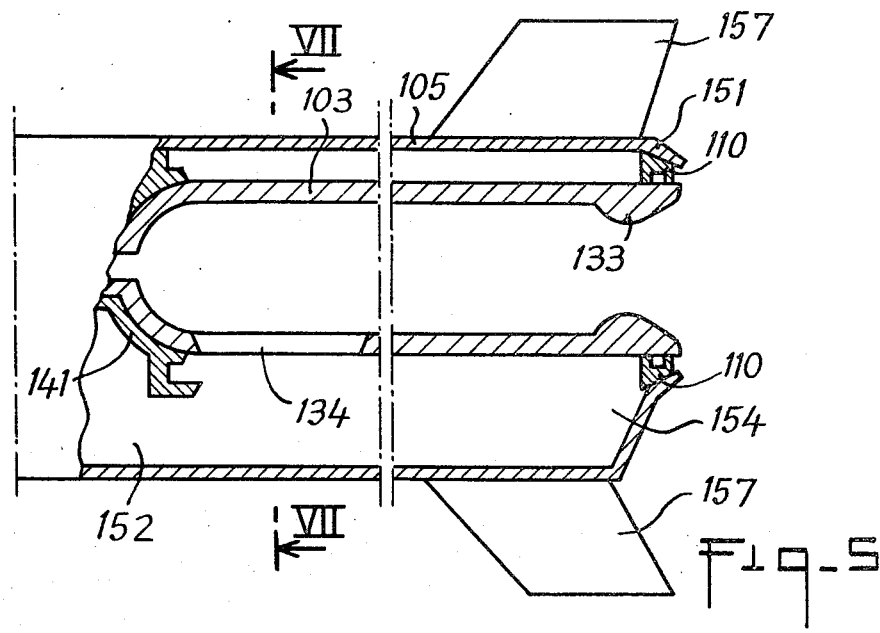
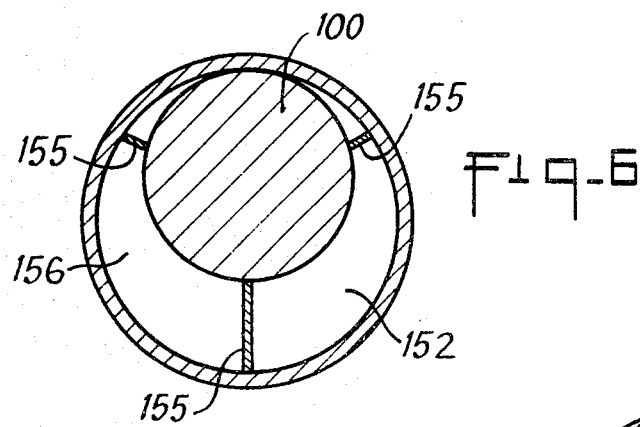
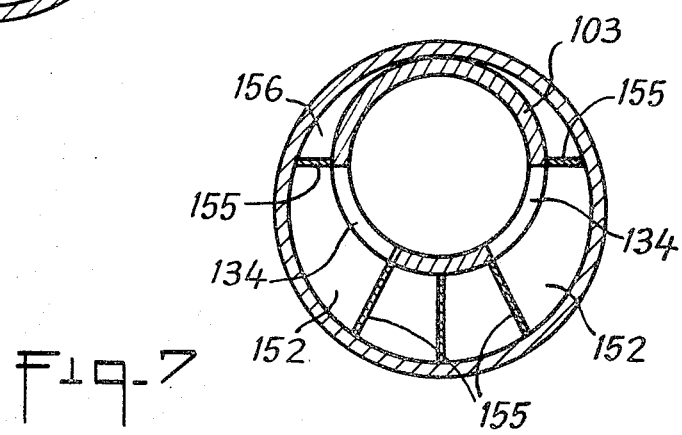

COMBUSTION CHAMBER FOR A RAMJET AND BOOSTER ROCKET

The present invention relates to a combustion chamber of a ramjet and booster rocket, presenting a first propulsion speed of the rocket type, called launching speed, obtained by the reaction of a fuel and a supporter of combustion disposed in the combustion chamber, and a second propulsion speed, called cruising speed, for which the supporter of combustion is constituted by the atmospheric air.

A so-called ramjet and booster rocket is a missile propelled by a device with two operating speeds.

The first speed, called "booster" speed or launching speed, enables the missile to be given a certain velocity, from an initial velocity which may or may not be zero. The acquisition of this velocity is obtained by a functioning of the rocket type, produced by the combustion of a block of propellant located in the combustion chamber common to the two operating speeds.

The second speed, called "ramjet" speed or cruising speed, is produced at the moment when the velocity of the missile is such (of the order of Mach 2) that a sufficient air flow may be picked up in air inlets (arranged to this end) to burn a defined flow of fuel so that the thrust produced by the combustion gases is greater than or equal to the drag of the missile at the velocity in question.

This second speed is characterised by propellant performances (specific impulsion in particular) which are noteworthy compared with those of a rocket as only one of the reactive products (the fuel) is supplied by a reserve carried by the missile.

During the first speed, the combustion chamber comprises one port only to the rear (propelling nozzle). During the second speed, the combustion chamber comprises one or more upstream ports through which atmospheric air is picked up between the chamber and a downstream port for ejection of the combustion products.

The combustion chamber of a ramjet and booster rocket must thus be capable of being adapted to two very different operating speeds.

In fact, functioning at launching speed requires a pressure in the combustion chamber which is generally clearly greater than the pressure prevailing at cruising speed (for example, a pressure of 70 bars may be provided at launching speed for a pressure of 7 bars at cruising speed). At launching speed, the combustion chamber must not comprise air inlet ports, or said latter must be hermetically closed. Furthermore, the diameter of the downstream port for the ejection of the gases at launching speed is different and very smaller than that which is suitable for cruising speed (for example, the ratio between the two diameters may be of the order of 5).

In known embodiments, the combustion chamber is mechanically dimensioned for the launching speed (which implies the highest pressure level). The modification of diameter of the ejection port is effected by jettisoning of the nozzle at the end of the launching phase. The opening of the air inlet ports consists in releasing covers and in jettisoning them through the combustion chamber and the throat adapted to cruising speed. Said ports are disposed either on the front bottom of the chamber (so called front covers) or on the front zone of the cylindrical part (so-called lateral covers).

Such embodiments present a certain number of drawbacks. In fact, the structure of the combustion chamber is heavy as it is dimensioned to the highest pressure level and weakened by the existence of ports closed by the covers which require a thickening of the structure around said ports. Moreover, the covers are generally multiple (2 to 8 covers) and may require as many unlocking members as there are covers to be released at the moment of transition. Finally, upon their ejection (under the effect of the pressure in the air inlets), the covers are taken to high speeds and their path very often cannot avoid impacts being produced on the inner wall of the chamber or on the throat of the gas outlet port adapted to the cruising speed. Now, the inner wall of the chamber is generally constituted by a composite material intended to resist the chemical ablation by the combustion gases and to ensure the inner thermal protection of the structure of the combustion chamber. This wall is thus unsuitable to withstand the impact of the covers without partial deterioration.

It is precisely an object of the present invention to remedy the above-mentioned drawbacks and to produce a combustion chamber for ramjet and booster rocket in which, in particular, covers are not used for obturating, during the booster phase, i.e. at launching speed, the air inlet ports necessary for the "ramjet" phase, i.e. operation at cruising speed.

These aims are attained due to a combustion chamber of the above-mentioned type, which, according to the invention, comprises an inner envelope provided with upstream lateral ports for the inlet of air and a downstream nozzle for the ejection of the combustion gases, to allow functioning of the rocket at cruising speed; an outer envelope, concentric to the inner envelope and closed, with the exclusion of a single rear port for the ejection of the gases, to allow functioning of the rocket at launching speed; and separating means for separating from the combustion chamber at least a part of the outer envelope, at the end of the launching phase, in order to ensure the clearance of the upstream lateral ports of the inner envelope.

Thus, the combustion chamber according to the present invention, which is applicable to ramjet and booster rockets with lateral air inlet ports of any shape, dimensions, number and implantation, provided that the ports are located in the cylindrical zone of the combustion chamber, avoids any use of covers for closing the air inlet ports during the booster phase. It is the outer envelope itself which ensures the closure of the air inlet ports during the launching phase.

A combustion chamber according to the present invention presents a certain number of advantages as the manufacture and operation of the combustion chamber are improved. The inner envelope which is defined for the cruising speed comprises upstream lateral ports for the inlet of air and a downstream port for the ejection of the combustion gases. The inner envelope is dimensioned so as to be able to withstand alone, the operating conditions at cruising speed and presents, in particular, a rear throat of large diameter fast with the structure of the envelope. The inner envelope is adapted to operation at a low pressure level and the nature of the materials of the inner wall is provided to withstand the combustion gases emitted at cruising speed. The outer envelope, which surrounds the inner envelope, is, on the contrary, not provided with ports at the air inlet level, is dimensioned to resist a high pressure level and is provided with a throat of small diameter adapted to functioning at launching speed.

In all cases, the launching phase occurs with the assembly of the two inner and outer envelopes fitted in each other, and it is only at the end of the launching phase that at least a part of the outer envelope is separated.

The separating means advantageously comprise means for cutting the outer envelope over the whole of its periphery and the clearance of the upstream lateral ports of the inner envelope is effected by relative sliding of the cut parts of the outer envelope.

The structure of the outer envelope may be cut both in a plane normal to the axis of the missile and in an oblique plane, and this may even be effected along a peripheral line of the envelope not contained in a single plane. After cut, it is possible to provide the slide of a single section with respect to the other, or of the two sections one with respect to the other.

After the outer envelope has been cut, only the rear part of the outer envelope is preferably sliding and takes along in its movement of ejection the nozzle dimensioned for functioning at launching speed.

The combustion chamber according to the invention advantageously comprises a supplementary outer structure in the form of a sleeve which surrounds the inner and outer envelopes and comprises air inlet conduits, so as to maintain the inner envelope under equal pressure during the phase of functioning at cruising speed. Apart from the connection between the air inlets and the chamber, this sleeve makes it possible not to stress the inner envelope mechanically in the zone where its mechanical strength is weakened by the existence of ports of large dimensions.

According to a particular embodiment, the supplementary outer structure is not prefectly tight on the side opposite the inlets of the air inlet conduits. This enables a cooling of the pieces in the zones most stressed thermally to be effected by a flow of only slightly heated air.

It is also possible, according to another embodiment, to provide the combustion chamber with a sliding sealing device capable of coming into abutment between the inner envelope and the supplementary outer structure, upon ejection of a part of the outer envelope at the end of the phase of functioning at launching speed.

According to a particular embodiment of the invention, the inner envelope is mounted with a small clearance inside the outer envelope so as to come into abutment on the outer envelope during the nominal operating speed at launching.

According to a variant, the inner envelope is mounted with a large clearance inside the outer envelope so that the inner envelope remains under equal pressure and does not deform during functioning at launching speed.

According to a further variant, a supplementary outer structure is provided which surrounds the inner and outer envelopes substantially as far as the rear of the chamber, so as to maintain the inner envelope under equal pressure during the phase of operation at cruising speed, and which comprises at least one air inlet conduit.

A first advantage results from the fact that, after separation of the outer envelope, the inner envelope remains with its lateral ports open and surrounded entirely by the supplementary outer structure. The inner envelope is therefore totally under equal pressure during operation at cruising speed.

A second advantage associated with the presence of the supplementary outer structure consists in the possibility of fixing control surfaces thereon completely at the rear of the rocket.

According to another feature of the combustion chamber according to this variant, the supplementary outer structure extends forwardly over at least a part of the length of the missile in order to effect the air intake upstream and the flow of the picked up air towards the combustion chamber.

The invention will be more readily understood on reading the following description with reference to the accompanying drawings, in which:

FIG. 1 is a schematic view in axial section through a combustion chamber according to the invention, during functioning at lauching speed.

FIG. 2 is a schematic view in axial section along II—II of FIG. 3 of the combustion chamber of FIG. 1, during functioning at cruising speed.

FIG. 3 is a view in radial section, along the plane III—III of FIG. 2, of the combustion chamber at cruising speed.

FIG. 4 is a partial, schematic view of a missile equipped with a combustion chamber according to a variant of the invention, during launching speed, seen partly in axial section.

FIG. 5 is a partial, schematic view of the missile shown in FIG. 4 during cruising speed, seen partly in axial section, and FIGS. 6 and 7 are views in radial section along the planes VI—VI and VII of FIGS. 4 and 5.

It should be noted that, in the Figures, the proportions of the various constituent elements have been falsified in order to render more clear the arrangement of the various elements. Thus, the thicknesses of the various stackings have been very considerably enlarged. The various conventional assembling elements have not been shown in the drawings.

Referring now to the drawings, FIG. 1 shows a combustion chamber according to the invention, adapted to operate at so-called booster or launching speed.

The free inner space of the combustion chamber is virtually entirely occupied by a block of propellant 1 provided with an axial recess 16 intended to allow the ignition of the block 1 from an igniter 6 which may for example be disposed on the front bottom of the combustion chamber, as shown in FIG. 1. The block of propellant 1 is coated with a layer of a material 2 ensuring the external inhibition of the propellant. This layer 2 may be eliminated in the case of the block of propellant being directly bonded on the inner wall of the combustion chamber.

An inner envelope 3, which constitutes a combustion chamber of a ramjet, surrounds the block of propellant 1. FIG. 1 shows the most general case of an inner envelope 3 constituted by an inner layer 31 of thermally protecting material and an outer layer 32 of a material ensuring holding under pressure. The layers 31 and 32 of the inner envelope 3 may, according to a variant embodiment, be constituted by a single material capable both of resisting chemical ablation and of withstanding the stresses associated with the inner pressure during functioning at cruising speed, despite the heating resulting from the considerable inner thermal flow.

The inner envelope 3 presents a throat 33, for the exhaust of the gases at cruising speed, which throat is made by a constriction in the downstream section of the envelope 3. Lateral ports 34 are pre-cut in the upstream cylindrical part of the inner envelope 3. These lateral ports 34 intended to allow the inlet of air at cruising speed may be of diverse number according to the applications envisaged. The shape and dimensions of the ports 34 may also be varied without departing from the scope of the invention.

No retractable cover is associated with the ports 34. During the launching phase, the ports 34 are closed by an outer envelope 4 which entirely covers the inner envelope 3 and ensures the reinforcement of this latter to allow it to withstand the high inner pressure which prevails inside the combustion chamber during functioning at launching speed. The outer envelope 4 presents a bottom or front part 1 and a cylindrical rear part 42. A nozzle 43, which defines an outlet orifice of relatively reduced diameter for the ejection of the gases during the launching phase, is disposed to the rear of the outer envelope 4 and fast therewith. The nozzle 43 may be integrated with the combustion chamber, as shown in FIG. 2, in order to give the propelling missile a greater compactness.

Shims 7 made of incompressible but supple material, for example rubber, may be provided to fill in the ports 34 pre-cut in the inner envelope 3, in order to promote the execution of the loading. The shims 7, of which the presence is not indispensable for the functioning of the combustion chamber according to the invention, are released and ejected with the outer envelope 4 is detached, at least partially, at the end of the launching phase.

During the launching phase, the combustion chamber functions with the two envelopes 3 and 4 fitted in each other, as shown in FIG. 1. In the particular embodiment described, at the beginning of the launching phase, during ignition, the inner envelope 3 swells under the effect of the inner pressure p and the outer diameter of the inner envelope 3 which presents a value D for $p=0$ increases with the pressure up to a value $D+\epsilon$ corresponding to a pressure $p_1$ which is the limiting pressure above which there is no more clearance between the inner envelope 3 and the outer envelope 4. When the pressure continues to increase to be established at nominal speed $P_0$ of the launching phase, the inner envelope 3 is in abutment on the outer envelope 4 which ensures the mechanical strength of the whole.

At the end of functioning at launching speed, i.e. when the surface of combustion of the block of propellant 1 becomes virtually zero, a transition speed is produced between the launching speed and the cruising speed. The transition phase finishes when the thrust of the cruising speed reaches the value of the aerodynamic drag forces.

At the end of combustion of the block of propellant 1, the pressure in the combustion chamber decreases from the pressure of speed $P_0$ to zero. When the level of pressure in the chamber has become lower than or equal to $P_1$, the inner envelope 3 is no longer in abutment on the outer envelope 4. It is then that the ports 34 made in the inner envelope 3 should be cleared. The combustion chamber according to the invention then enables a peripheral cut of the outer envelope 4 to be made in a zone 44, for one or the other, or the two parts 41 and 42 thus separated from the outer envelope 4 to be able to slide freely on the inner envelope 3. The cut, made in the zone 44 where the air inlet ports 34 are arranged on the inner structure 3, so that the sliding of the outer envelope 4 clears these ports, can be of any form, adapted to each particular arrangement. The most simple shape is a circumferential cut in a plane perpendicular to the axis of the combustion chamber. It is of course possible to effect a separation in the outer envelope 4 by means of any suitable device such as an ejectable strap, two half-clamps.

In accordance with the invention, it is possible to provide, when a separation has been made in a zone 44 of the outer envelope 4:
  either that only the rear part 42 be made to slide, the front bottom 41 remaining fixed,
  or that the front bottom 41 to which the front section of the envelope 4 which covers the ports 34 of the inner envelope 3 must remain attached, be made to slide, the rear part of the envelope 4 remaining fixed,
  or that the two separate section 41 and 42 of the outer envelope 4 be made to slide simultaneously over equal or different strokes.

The slide of the outer envelope 4 is produced in all cases naturally, as soon as the cut is effected, in view of the axial stresses connected with the existence of an inner pressure higher than ambient pressure.

It is generally preferable, as in the case of the particular embodiment described with reference to FIGS. 1 to 3, to effect a cut upstream of the ports 34 and to allow the rear part 42 of the outer envelope 4 to slide. Consequently, upon ejection of the part 42, both an opening of the air inlets 34 and the ejection of the nozzle 43 are produced. Moreover, such a measure does not involve any loss of internal volume to the propelled missile, as is the case when the front bottom 41 moves, and the ejection of a large mass (part 42) at the end of the launching phase participates in the acquisition of the velocity compatible with the cruising speed. Finally, the lightening of the missile of most of the mass of structure dimensioned for speed at high pressure enables less inertia to be had for possible phases of acceleration at cruising speed.

Referring to FIG. 1, a detonating fuse 8 for cutting is seen, disposed around the outer envelope 4 in a plane previously made by a reduction in thickness of the metal compatible with the axial stress due to the pressure at launching speed, and by the positioning of a filler 9 adapted to dampen the effects of the shock wave produced by the detonating fuse 8 with the purpose of protecting the inner envelope 3 at right angles to the detonating fuse 8.

After the cut in the zone 44 of the outer envelope 4, the residual pressure in the combustion chamber produces on the inner face of the nozzle 43 a more considerable force than the force due to the gases expanding in the diverging part of the nozzle 43. Consequently, the resultant force has for its effect to make the whole of the part 42 of the outer envelope 4 and the nozzle 43 slide, until disconnection with respect to the inner envelope 3.

During the stroke of the mobile assembly 42, 43, there is, successively, a partial clearing of the air inlet ports 34 with ejection of the shims 7 in the combustion chamber; a turning up of the inhibiting material 2 due to its form associated with the inner chamber 3 (which presents a front bottom provided with a hole 36 which is small compared with the air inlet ports 34 and the throat 33); and a driving of two sealing half-clamps 10 towards the rear by means of a device connected to the outer envelope 4 in movement.

The combustion chamber according to the invention is equipped with a third structure 5, in the form of a sleeve, which is outside the envelopes 3 and 4 and of which the length is limited to that of the zone bearing the air inlets 34. This outer structure 5 is made fast with the front bottom 41 of the outer envelope 4 and terminates at the rear in a part 51 of truncated form. The outer structure 5 makes it possible to effect the seal of the combustion chamber in the zone of the air inlets 34 and to maintain the structure of the inner chamber 3 at equal pressure in the zone where the air inlet ports are cut, during the cruising speed.

The seal, after cutting of the outer envelope 4 and ejection of the rear part 42 of this envelope, is obtained by means of two half-clamps 10 which, under the influence of the inner pressure in the combustion chamber are maintained in abutment between the sleeve 5, at the level of its rear end 51, and the inner envelope 3 (FIG. 2).

In the representation of FIG. 1, the drive of the half-clamps 10 is obtained by means of a plurality of metal foils 11 distributed over the periphery of the envelope 4 and provided with a slot 12 in order to allow a certain relative stroke between the foil 11 and the envelope 4 on which is fixed a stud 13 for each foil 11. The foils 11 drive the half-clamps 10 provided with an inner groove 15 by means for a finger 14 fast with the upstream end of the foil 11.

The half-clamps 10 driven by the foils 11 during slide of the rear part 42 of the envelope 4 are then fitted in the downstream conical part 51 of the outer sleeve 5 (the downstream part of the half-clamps 10 is of smaller diameter than the upstream part). At this moment, the studs 13 have themselves been sheared and have released the foils 11 (FIG. 2).

The transition phase terminates when, after the inhibitor material 2, the shims 7, the part 42 of the outer envelope 4 and the nozzle 43 have been ejected, a flow of atmospheric air, mixed upstream with fuel, is established through the air inlets 53 of the air inlet pipes 52 of the outer sleeve 5 located at the level of the ports 34, the inner space of the inner envelope 3 then freed of the propellant 1, and the throat 33. A so-called ramjet igniter, which has not been shown in the drawings and may be placed at various places in the space inside the inner envelope 3, then ensures inflammation of the mixture of air and supporter of combustion and enables functioning at cruising speed to be triggered off, this corresponding to the structure of FIGS. 2 and 3.

The actual outer structure 5, the front bottom 41 of the outer envelope 4 and the air inlet pipes 52 may be constituted by a single piece. However, in practice, it may be advantageous to produce each of these elements separately and then to assemble them in tight manner.

It should be noted that the gap 54 between the outer sleeve 5 and the inner envelope 3 is supplied with atmospheric air which is a relatively cold gas. Thus, the absolute seal at the level of part 51 of the sleeve 5 is not necessarily desirable, and a slight leakage may, in certain cases, be useful for contributing to the cooling of the pieces in contact with the slight flow of leakage of air. The rate of the annular flow of air which is thus produced between the inner envelope 3 and the outer structure 51, and the orientation of the speed vectors of the thin air streams may be rendered optimum by calibrating one or more leakage orifices either at the level of the half-clamps 10, or at the level of the actual outer sleeve 5. In order to avoid heating by conduction of the outer sleeve 5, the half-clamps 10 may advantageously be made of a thermally insulating material.

It follows from the above that the combustion chamber according to the invention is adapted to a good functioning both at launching speed and at cruising speed and facilitates the production of the transition phase.

A variant embodiment will now be described hereinbelow with reference to FIGS. 4 to 7.

FIG. 4 illustrates a missile 100 provided, at the rear, with a combustion chamber adapted to function at launching speed.

An inner envelope 103 surrounds a block of propellant 101 which serves for propulsion during the launching phase. The inner envelope 103 comprises upstream lateral ports 134 and a rear throat 133 adapted to allow, respectively, the inlet of air and the exhaust of the gases at cruising speed.

The ports 134 are obturated by an outer envelope 104 which is provided at the rear with a nozzle 143 for the ejection of the gases and which covers the envelope 103 entirely and ensures the reinforcement thereof to support the pressure of the gases during the launching phase.

The envelope 104 comprises a front part 141 and a rear part 142 separable from each other by cutting in a zone 144, all around the envelope, by means for example of a detonating fuse 108. After cutting, the rear part 142 slides on the inner envelope 103 and uncovers the ports 134 to allow functioning at cruising speed after the end of the launching phase.

For greater details on the structure and function of the inner and outer envelopes of the combustion chamber, reference may be made to the description with regard to FIGS. 1 to 3.

A supplementary outer structure 105 of tubular form surrounds the envelopes 103 and 104 up to the rear end of the combustion chamber where it terminates in a truncated part 151.

The structure 105 and the inner and outer envelopes may be coaxial. In the example shown, the structure 105 is eccentric with respect to envelopes 103 and 104.

As soon as the cut of the envelope 104 is effected in the zone 144, at the end of the launching phase, the part 142 and the envelope 104 and the nozzle 143 slide until they separate from the rest of the missile. During this stroke, the clearing of the ports 134 and the drive towards the rear of two sealing half-clamps 110 by means of a device connected to the envelope 104 are successively observed.

At cruising speed, the structure 105 totally surrounds the envelope 103, defining therewith a space 154. The envelope 103 is then maintained under equal pressure in its entirety.

The seal of the space 154, after ejection of the part 142 of the envelope 104, is ensured by the half-clamps 110 which are applied against the truncated end of the structure 105 (FIG. 5). The clamps 110 are given, to this end, a truncated form corresponding to that of the part 151.

The drive of the half-clamps is effected, as described with reference to the embodiment of FIGS. 1 to 3, by means of metallic foils 111 fixed on the envelope 104 by studs 113, each foil 111 bearing a finger 114 engaged in a inner groove 115 of a half-clamp.

As soon as the half-clamps 110 are applied against the end 151 of the envelope 105, the pistons have been sheared, the tightness of the space 154 is ensured, and the functioning at cruising speed may commence.

The tightness ensured by the half-clamps 110 is preferably not absolute in order to conserve in the space 154 a flow participating in cooling.

The structure 105 extends forwardly of the missile 100 over all or part of the length thereof.

The space between the inner face of the structure 105 and the walls which it surrounds over its length is used to constitute, by means for example of longitudinal grooves 155, air inlet pipes 152 which open out at the level of ports 134 (FIGS. 6 and 7).

The pipes 152 effect the air inlet upstream and the flow of the air picked up towards the combustion chamber where this air serves as supporter of combustion at cruising speed.

In the example illustrated, the structure 105 is eccentric with respect to the axis of the envelopes 103 and 104 and the pipes 154 are provided in the zone of largest transverse section of the annular space 156 defined by the structure 105 and the wall which this structure surrounds.

The extension to the rear end of the structure 105 enables control surfaces 157 to be fixed at the rear of the missile.

The devices (not shown) for manoeuvring the control surfaces are implanted inside the annular space 156 in a zone not used for the flow of the air.

What is claimed is:

1. In a so-called ramjet and booster rocket, a combustion chamber presenting a first speed of propulsion of the rocket type, called launching speed, obtained by the reaction of a fuel and a supporter of combustion disposed in the combustion chamber, and a second speed of propulsion, called cruising speed, for which the supporter of combustion is constituted by atmospheric air, said combustion chamber comprising an inner envelope provided with upstream lateral ports for the inlet of air and a downstream nozzle for ejecting the combustion gases, to allow functioning of the rocket at cruising speed; an outer envelope, concentric to the inner envelope and closed, with the exclusion of a single rear port for the ejection of the gases, to allow functioning of the rocket at launching speed, and separating means for separating from the combustion chamber at least a part of the outer envelope, at the end of the launching phase, in order to ensure the clearance of the upstream lateral ports of the inner envelope.

2. The combustion chamber of claim 1, wherein the separating means comprise means for cutting the outer envelope over the whole of its periphery and the clearance of the upstream lateral ports of the inner envelope is effected by relative sliding of the cut parts of the outer envelope.

3. The combustion chamber of claim 2, wherein, after cutting of the outer envelope, only the rear part of the outer envelope is sliding and takes along in its movement of ejection the nozzle dimensioned for functioning at launching speed.

4. The combustion chamber of claim 1, further comprising a supplementary outer structure in the form of a sleeve which surrounds the inner and outer envelopes and comprises air inlet conduits, so as to maintain the inner envelope under equal pressure during the phase of functioning at cruising speed.

5. The combustion chamber of claim 4, wherein the supplementary outer structure is not prefectly tight on the side opposite the inlets of the air inlet conduits.

6. The combustion chamber of claim 4, wherein it further comprises a sliding sealing device capable of coming into abutment between the inner envelope and the supplementary outer structure, upon ejection of part of the outer envelope at the end of the phase of functioning at launching speed.

7. The combustion chamber of claim 6, wherein the sliding sealing device is made of thermally insulating material.

8. The combustion chamber of claim 1, further comprising shims for obturating the air inlet upstream lateral ports of the inner envelope, which shims are released and ejected upon ejection of part of the outer envelope at the end of the launching phase.

9. The combustion chamber of claim 1, wherein the inner envelope is mounted with a small clearance inside the outer envelope so as to come into abutment on the outer envelope during nominal operating speed in the launching phase.

10. The combustion chamber of claim 1, wherein the inner envelope is mounted with a large clearance inside the outer envelope so that the inner envelope remains under equal pressure and does not deform during functioning at launching speed.

11. A combustion chamber of a missile of the so-called ramjet and booster type, presenting a first speed of propulsion of the rocket type, called launching speed, obtained by the reaction of a fuel and a supporter of combustion disposed in the combustion chamber, and a second speed of propulsion, called cruising speed, for which the supporter of combustion is constituted by atmospheric air, said chamber comprising an inner envelope provided with upstream lateral ports for the inlet of air and a downstream nozzle for ejecting the combustion gases, to allow functioning of the rocket at cruising speed; an outer envelope, concentric to the inner envelope and closed, with the exclusion of a single rear port for the ejection of the gases, to allow functioning of the rocket at launching speed; and separating means for separating from the combustion chamber at least a rear part of the outer envelope, at the end of the launching phase, in order to ensure the clearance of the upstream lateral ports of the inner envelope, wherein it comprises a supplementary outer structure which surrounds the inner and outer envelopes substantially as far as the rear of the chamber, so as to maintain the inner envelope under equal pressure during the phase of functioning at cruising speed, and which comprises at least one air inlet conduit.

12. The combustion chamber of claim 11, wherein the supplementary outer structure extends forwardly over at least a part of the length of the missile in order to effect the intake or air upstream and the flow of the air picked up towards the combustion chamber.

13. The combustion chamber of claim 11, wherein each air inlet conduit is constituted by a longitudinal passage defined by the outer structure and the wall surrounded thereby.

14. The combustion chamber of claim 11, wherein the supplementary outer structure carries control surfaces fixed on its outer surface to the rear of the chamber.

* * * * *